United States Patent [19]

Rosenthal et al.

[11] Patent Number: 5,740,406
[45] Date of Patent: Apr. 14, 1998

[54] METHOD AND APPARATUS FOR PROVIDING FIFO BUFFER INPUT TO AN INPUT/OUTPUT DEVICE USED IN A COMPUTER SYSTEM

[75] Inventors: David S. H. Rosenthal, Palo Alto; Curtis Priem, Fremont, both of Calif.

[73] Assignee: NVidia Corporation, Sunnyvale, Calif.

[21] Appl. No.: 443,878

[22] Filed: May 15, 1995

[51] Int. Cl.⁶ ............................................. G06F 13/10
[52] U.S. Cl. ...................... 395/500; 395/250; 395/821; 395/823; 395/825; 395/872; 395/412; 364/260; 364/260.1; 364/231.6; 364/DIG. 1
[58] Field of Search ............................. 395/500, 250, 395/821, 650, 825, 823, 829, 872, 412; 364/228.1, 229, 229.4, 230, DIG. 1, 260, 260.1, 231.6, 234.3

[56] References Cited

U.S. PATENT DOCUMENTS

| | | |
|---|---|---|
| 3,564,502 | 2/1971 | Boehner et al. |
| 3,992,699 | 11/1976 | Krumbach ........................ 395/250 |
| 4,281,315 | 7/1981 | Bauer et al. ..................... 340/147 R |
| 4,282,399 | 8/1981 | Kippenhan, Jr. et al. ............... 178/4 |
| 4,410,942 | 10/1983 | Milligan et al. ..................... 395/250 |
| 4,435,762 | 3/1984 | Milligan et al. ..................... 395/250 |
| 4,459,681 | 7/1984 | Ohtsuka ............................. 365/78 |
| 4,847,812 | 7/1989 | Lodhi ............................... 365/221 |
| 4,962,483 | 10/1990 | Lodhi ............................... 365/221 |
| 4,995,005 | 2/1991 | Lodhi ............................... 365/221 |
| 5,060,140 | 10/1991 | Brown et al. ...................... 395/285 |
| 5,127,098 | 6/1992 | Rosenthal et al. .................. 395/650 |
| 5,224,093 | 6/1993 | Denzel et al. ....................... 370/60 |
| 5,327,558 | 7/1994 | Burke et al. ....................... 395/650 |
| 5,455,955 | 10/1995 | Kida et al. ......................... 395/800 |
| 5,504,898 | 4/1996 | Klein .............................. 395/650 |

*Primary Examiner*—Kevin J. Teska
*Assistant Examiner*—Thai Phan
*Attorney, Agent, or Firm*—Stephen L. King

[57] ABSTRACT

An input circuit for an input/output device adapted for use in a computer system in which a command includes information indicating an application program which initiated the command, the input circuit including a first-in first-out (FIFO) buffer circuit having a plurality of stages, each stage providing storage for commands from application programs including both data and an address for the data, circuitry for determining from a command an application program which has initiated a command, and circuitry for assuring that commands from only one application program reside in the FIFO buffer at any time.

24 Claims, 6 Drawing Sheets 5,740,406

METHOD AND APPARATUS FOR PROVIDING FIFO BUFFER INPUT TO AN INPUT/OUTPUT DEVICE USED IN A COMPUTER SYSTEM

BACKGROUND OF THE INVENTION

1. Field of the Invention

This invention relates to computer systems, and more particularly, to a method and apparatus for providing flow control of input/output operations of first-in first out (FIFO) circuits in computer systems.

2. History of the Prior Art

Modern computer system are typically based on an architecture which was first offered in the Digital Equipment Corporation (DEC) PDP 11 computer. One problem with this architecture as with earlier IBM and CDC mainframe architectures is that writing directly to the input/output devices of the system by an application program is prohibited. Although this architecture allows all of the facilities of the central processing unit to be used for input/output, it requires that the operating system running on the central processing unit attend to all of the input/output functions using trusted code. This significantly slows any input/output operation of the computer.

In contrast to earlier mainframe systems, in the PDP-11 architecture, there is no process by which the input/output performance of the system can be increased except by increasing the speed of the central processing unit or the input/output bus. This is an especial problem for programs which make heavy use of input output/devices such as video and game programs which manipulate graphics and high quality sound extensively.

In a modern computer, the central processing unit and the input/output devices operate at different speeds. It can be very inefficient for a modern central processing unit to wait until an input/output write operation is complete before performing the next operation which often has nothing to do with input/output. On the other hand, a central processing unit has to wait for the result of a read operation because it needs the result produced.

Since most central processing unit accesses to input/output devices are write operations, the designers of systems and input/output devices attempt to decouple the central processing unit and input/output devices as far as write operations are concerned by implementing write queues using first-in first-out (FIFO) write buffers. These buffers may appear at various places in a particular implementation: as a part of the central processing unit, as part of a bridge chip, or as part of an input/output device.

One problem raised in systems using FIFO buffers is that an input/output device and the buffers supplying it must accept all information written to them over the input/output bus. Although some input/output buses allow devices to "hold off" writes, that is, delay the completion of the write operation until the device has enough resources available to store the data, there is always a limit to how long a write can be held off. If a write is held off too long the data will be lost. In the limit, the input/output device has no alternative but to store all data written to it. In a system utilizing FIFO buffers for storage of this data at the input/output device, the FIFO buffers must ultimately store the data.

Since any practical input/output device will have limited FIFO buffer storage for holding data written to it over the input/output bus, any architecture for input/output devices must include some technique for controlling the flow of data so that this storage is not exhausted.

It is desirable to provide a means for providing flow control for a computer system or similar system utilizing FIFO buffers to receive data so that the operation may proceed as rapidly as possible without loss of data. A new input/output architecture which allows input/output operations to proceed at a faster rate by allowing application programs to write directly to input/output devices used with advanced multi-tasking operating systems has now been designed. One of the features of this system is the use of a write buffering arrangement including FIFO buffers.

In order to utilize FIFO buffers, it is necessary to provide arrangements by which commands directed to input/output devices from different application programs may utilize the FIFO buffers safely while writing directly to the input/output devices.

SUMMARY OF THE INVENTION

It is, therefore, an object of the present invention to provide a means for allowing the use of FIFO buffers as the input stage of input/output devices in a computer system.

It is another object of the present invention to provide optimal use of FIFO buffers for buffering write operations to input/output devices in a computer system.

These and other objects of the present invention are realized in a system which uses an arrangement of FIFO buffers in which each FIFO buffer accepts data from only one application program. In order to assure that no data written to a FIFO by an application program will interfere with data of another application program, a different portion of the address space of an input/output device is assigned to each application program. This unique address space is then utilized to test incoming commands to assure that commands from only a single application program reside in any FIFO. In one embodiment, the number of FIFO buffers is reduced by an arrangement which provides for switching FIFO buffers between different application programs so that a FIFO buffer acts as a cache for the commands from a single application program at a time.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
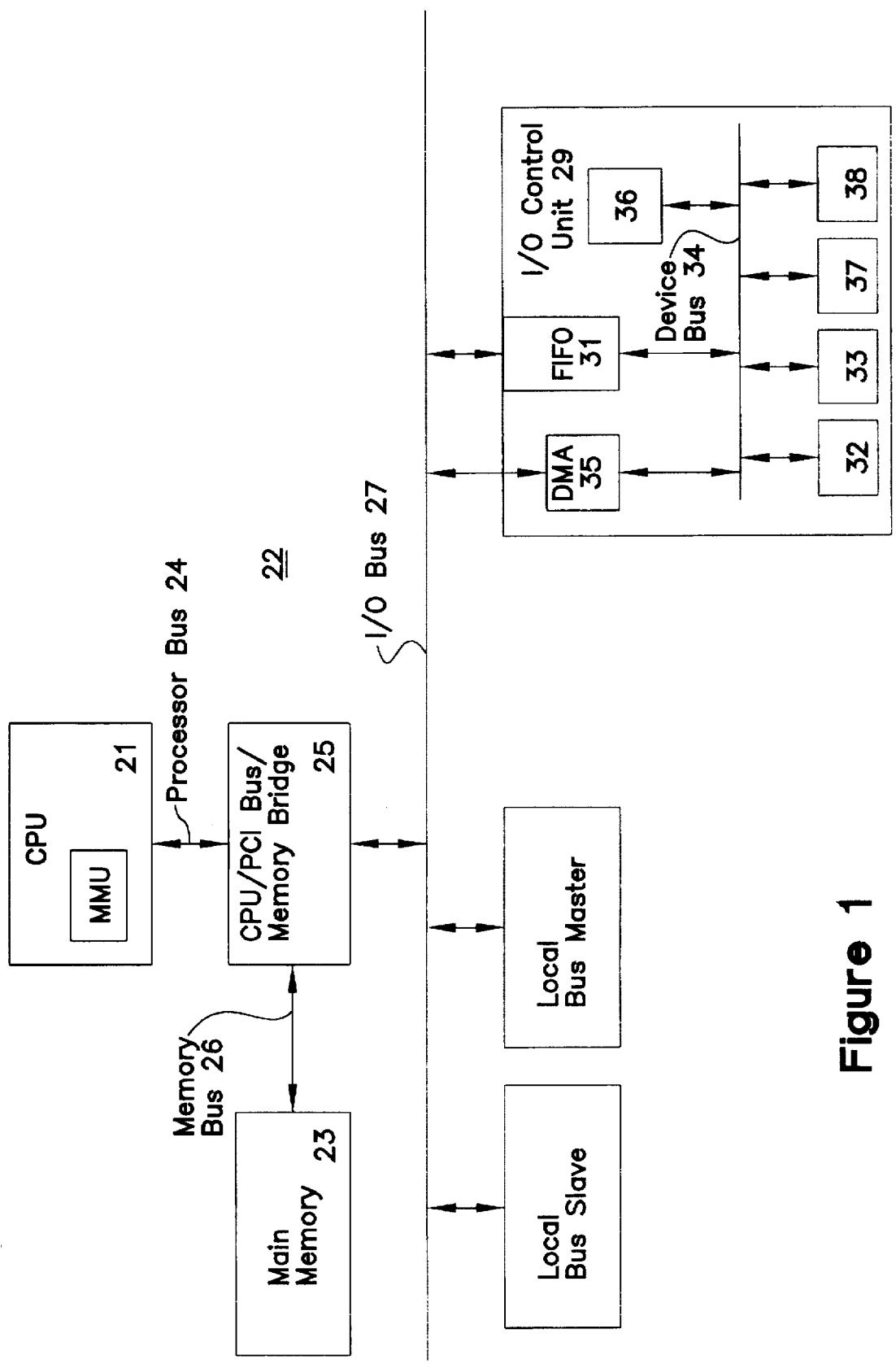
FIG. 1 is a block diagram of a computer system providing facilities by which a central processing unit may write directly to input/output devices.

FIG. 1 is a block diagram of a computer system 22 which has been devised to overcome the problems of the prior art. The system 22 provides a new input/output architecture which cooperates with other components of present systems based on the PDP 11 architecture, runs legacy code for those systems, yet is able to drastically increase the speed of input/output operations for new application programs. In order to accomplish this, the new architecture of the system allows read and write operations by application programs to be made directly to the input/output devices. This eliminates the cumbersome multi-step software processes invoked by prior art systems using the operating system and trusted code for every input/output access. In order to accomplish the process safely, the input/output architecture of the system 22 utilizes an input/output control unit 29 which provides its own virtual name-to-physical-device and context translation for all of the input/output devices associated with the new control unit 29 on its own device bus 34. By enforcing this translation, application programs can write directly to input/output devices without affecting assets of other application programs. Once this translation from virtual names furnished by the application programs to physical input/output devices on the device bus is accomplished and context has been furnished to the input/output devices, translation of addresses of input/output devices on the input/output bus into physical addresses on the device bus 34 is accomplished directly by hardware at the input/output control unit 29. This hardware also checks permissions; and, when an operation is known to be safe, it is performed by hardware. When a translation operation fails, the operating system software is invoked. Thus, rather than trapping every input/output operation to determine whether it is safe as is done in prior art computer systems based on the PDP 11 architecture, the system 22 traps and sends to operating system software only unsafe operations allowing hardware to accomplish most translations and greatly speeding the access of input/output devices.

The architecture of the system 22 has been designed so that it eliminates almost all read operations of input/output devices by the central processing unit. In order to accomplish this, the input/output control unit 29 includes a first-in first-out (FIFO) unit 31 for storing write operations directed to the input/output control unit. The FIFO unit 31 queues incoming write operations. Unlike FIFO units in prior art systems, it stores both addresses and data. This allows the write operations to the input/output control unit 29 to occur asynchronously so that both the central processing unit 21 and the input/output control unit 29 may be functioning independently of one another and neither need wait for operations of the other.

To help maintain this asynchronous operating arrangement and to eliminate read operations to the extent possible, the input/output control unit also includes an advanced direct memory access (DMA) device 35 which provides direct memory access for operations conducted involving input/output devices. The DMA device 35 allows the results of input/output operations to be written from input/output devices to main memory 23 rather than requiring read operations by the central processing unit 21 to obtain these results. This eliminates almost all need for the central processing unit 21 to read input/output devices and drastically increases the overall speed of input/output operations. The DMA device 35 includes its own memory management unit which allows writes from input/output devices to the virtual memory space of an application without involving the operating system in the translation process.

Although the input/output architecture of system 22 may be used with systems utilizing a single input/output bus for all operations, the preferred embodiment of system 22 functions as well in a system utilizing a local bus 27 such as the Peripheral Component Interconnect (PCI) bus or the Video Electronics Standards Association (VESA) local bus which may be associated with other input/output buses. While the discussion of this specification wil assume that bus 27 is a local bus, the local bus 27 is also referred to in this specification as the input/output bus 27 in order to emphasize its use. In arrangements utilizing local buses, the central processing unit 21 and main memory 23 are typically arranged on a processor bus 24 and a memory bus 26, respectively, and are joined to a bridge unit 25. The central processing unit 21 typically includes a memory management unit. The bridge unit 25 provides write buffering for operations between the central processing unit 21 and the input/output bus 27, between the central processing unit 21 and main memory 23 on the processor bus 24 and the memory bus 26, and between the input/output bus 27 and main memory 23.

Typically, various input/output devices are arranged on the input/output bus 27 as bus masters and bus slaves. In prior art systems, these local bus masters and slaves are those components (such as a graphics output device for connecting an output display monitor or a hard disk controller unit) which require the most rapid input/output operations for system success. If such local bus masters and slaves are connected to the input/output bus 27, they are utilized with the present architecture for the purpose of running legacy programs and input/output functions not implemented by the input/output control unit 29.

In the architecture of system 22, an input/output control unit 29 is shown joined to the input/output bus 27. The control unit 29 includes a hardware FIFO unit 31 for receiving incoming commands addressed to the input/output devices on a device bus 34.

Figure 2:
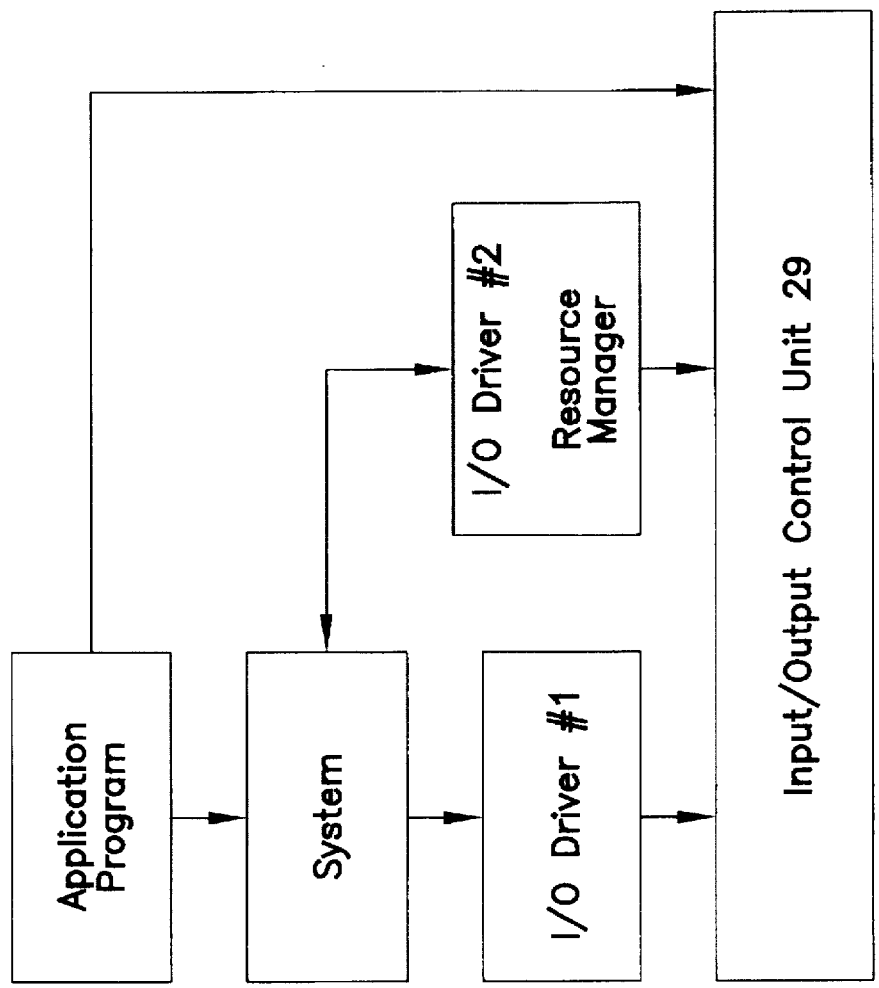
FIG. 2 in a diagram illustrating the operation of software in the architecture of the present invention.

The general operation of the input/output unit 29:

FIG. 2 illustrates the manner in which operations are conducted by software in the new architecture. An application program which utilizes the new architecture may issue a command requesting permission from the operating system to map certain of the physical addresses decoded by the input/output control unit 29 into the address space of the application program. The operating system, using a new I/O driver #1, allots some portion of the system physical addresses which the input/output control unit 29 is decoding to the particular application program address space for its use only and installs the virtual-to-physical input/output bus address translations for the application program in the memory management unit In a typical computer system, the memory management unit stores translations for what are referred to as pages of memory. If the size of the portion of system physical addresses allotted to an application program is a multiple of the memory management unit page size, then the I/O driver #1 can use the memory management unit to ensure that no more than one application program may access each area.

Installing the appropriate translations in the memory management unit of the central processing unit 21 creates a path around the operating system by which the application program may directly read from and write to the hardware of the input/output control unit 29. The application program then writes to these allotted input/output bus addresses providing as data a virtual name of its choice for an input/output device on the device bus 34. The input/output control unit 29 takes the input/output address and the virtual name and uses it to first create and then install a translation from input/output bus addresses to device bus addresses in its internal hardware and to place the context required by the application program in that input/output device. Once this has occurred and for so long as the application program continues to run, the application program writes commands which the memory management unit associated with the central processing unit translates to the physical addresses on the input/output bus 27 for the input/output control unit 29; and the input/output control unit 29 further translates the input/output bus addresses of the commands to physical addresses of input/output devices on the device bus 34. In this way, the application may write directly to the input/output unit in order to utilize an input/output device such as the graphics output controller 33 without requiring any software intervention by the operating system. As will be understood from the more detailed description which follows, the use of many identically-sized input/output device address spaces each assigned for use only by one application program allows the input/output addresses to be utilized to determine which application program has initiated any particular input/output write operation.

Area addresses

Figure 3:
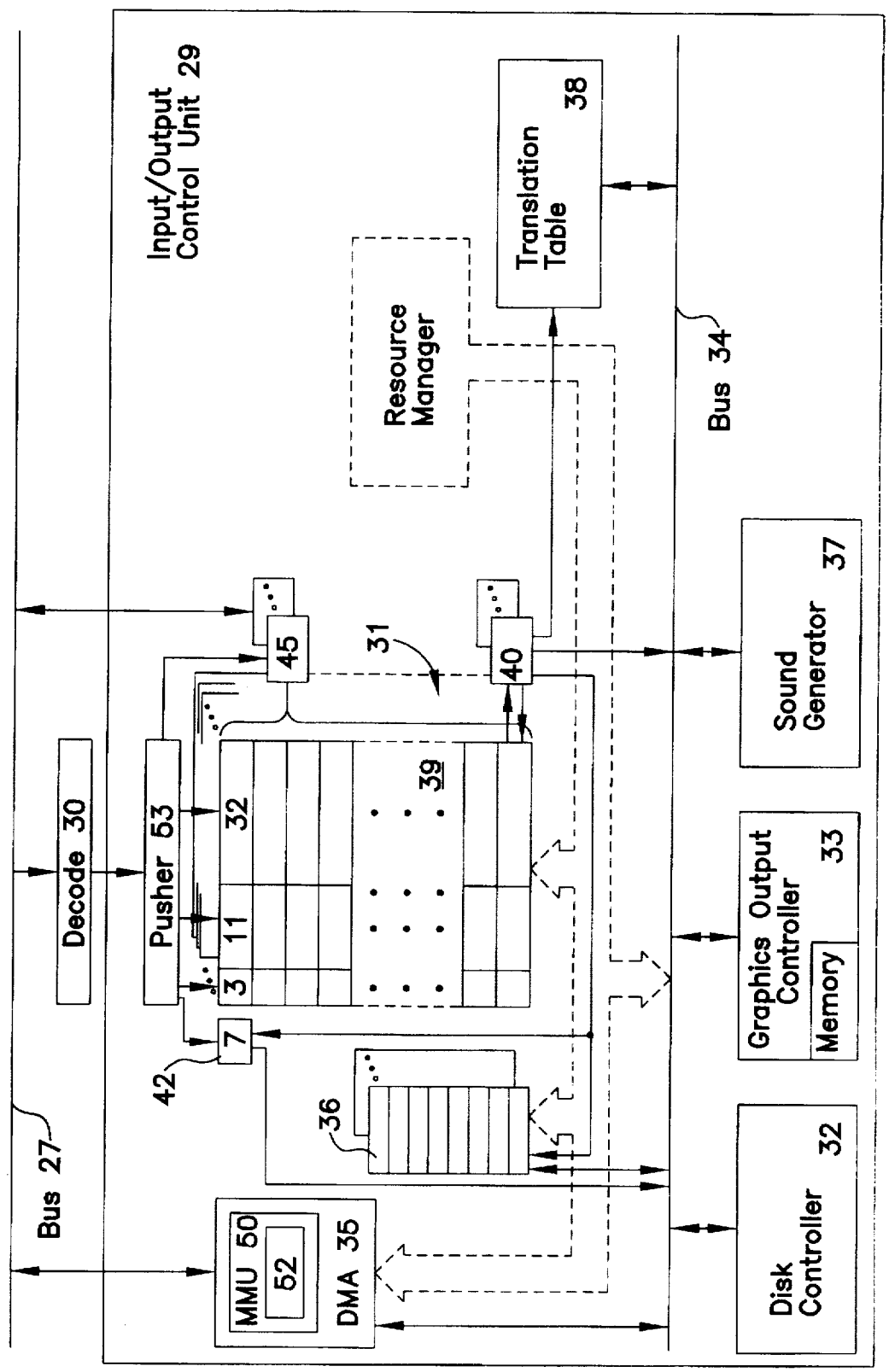
FIG. 3 is a block diagram of one embodiment of input/output circuitry used in a personal computer system such as that illustrated in FIG. 1 designed in accordance with the present invention.

In one embodiment, the FIFO unit 31 includes a plurality of FIFO buffers 39 (see FIG. 3). When an application program desires to write to an input/output device on the device bus 34, it addresses that device. Decoding circuitry decodes the address by reviewing a number of the highest order bits decoded by the chip sufficient to indicate a unique portion of the input/output address space assigned to an application program and places the command in the appropriate FIFO buffer 39 for that application program. Each FIFO buffer 39 handles commands only from the application program to which the address area has been mapped. An arrangement using a smaller number of FIFO buffers 39 than one buffer for each application program (as few as a single buffer 39) could also be utilized as long as the address of the FIFO buffer is mapped to only one application program at a time.

The unit 29 receives physical addresses furnished by the memory management unit and virtual names furnished by application programs for operations to be performed which have been sent to the FIFO unit 31 and controls the translation of those virtual names for all input/output devices. The hardware unit 29 includes the device bus 34 to which the individual input/output devices such as a disk controller 32, a graphics output controller 33, and a sound generator 37 are shown joined. The unit 29 also includes a DMA unit 35 which is adapted to transfer data between the individual input/output devices and main memory for use by the central processing unit or other components of the system.

Creation of a safe translation for an input/output device

When the code of an application program is written to take advantage of the new architecture, a safe translation for an input/output operation utilizing a physical input/output device must first be created. A safe translation for an application to utilize an input/output device requires not only a correct physical address for the device but also correct context so that the device will function appropriately with the device. To create such a safe translation, the application program sends a first special calling command adapted to call an input/output device to the input/output control unit 29; this special calling command includes as data a predefined name such as "LINE_DRAWER" selected by the application program in accordance with a prescribed naming convention. The command is transferred directly to the addressed one of the FIFO buffers 39 of the FIFO unit 31 where it is placed in a FIFO queue. At this point, the central processing unit 21 may go off to other work. When this special calling command reaches the bottom of the FIFO buffer 39, no translation between this predefined virtual name and a physical address on the device bus 34 is resident in hardware. This causes an interrupt, and the predefined name is sent to a second new input/output driver called the "resource manager" associated with the control unit 29. The resource manager keeps an internal data base of data structures representing particular types of input/output devices under the predefined names. The resource manager looks up this known predefined name in its internal database of data structures with predefined names and finds the data structure defining that device in the data base. The resource manager makes this predefined data structure available for immediate use. In order to utilize the general device definition provided by the data structure, the application program then provides its own virtual name for that device as data and using a "create" command, and the resource manager creates a new data structure in its internal database using the virtual name the application furnishes for that specific instance of the device (e.g., MY_LINE_DRAWER). This new data structure includes the various properties of the general device having the data structure with the predefined name including the physical address on the device bus 34 of the hardware which provides the function for the predefined name and any context required by the hardware for operation.

When the application program later wants to utilize that newly-named object representing an input/output device, the application program writes the virtual name chosen with a special calling command which calls an object for the input/output device. The resource manager looks up the new data structure which has been created and (for a physical device) finds the context and physical address on the device bus 34 for the particular input/output device now described by the name. The resource manager changes any context at the input/output control unit 29 required by the new input/output device which has been named. The physical address on the device bus 34 which has been found is then placed in hardware to provide a translation from the input/output bus addresses so that when commands are sent to the same input/output device from the application program, they are routed by hardware to the particular addressed input/output device on the device bus 34.

Unsafe operations

In any case in which the input/output device to which the operation is directed is unknown to the control unit 29, the unit 29 calls the "resource manager" which runs on the central processing unit and functions as a portion of the operating system. The resource manager determines how the operation is to be handled. The operation may be a write by a new application program (such as that described above) requiring various set up operations before it may proceed. If an operation requires context changes at the input/output device, this is handled by the resource manager. If an operation requires a procedure which is not yet in order under the operating system such as requiring data from memory which is not in memory at that time, the resource manager transfers the command to the operating system to perform the necessary memory transfers (or the like) which allow the commanded operation to proceed. Alternatively, the operation may be directed to a device which is not otherwise associated with the control unit 29 such as a LAN interface or other bus master or slave on the input/output bus 27 which is not manufactured to cooperate with the unit 29. If such a device is addressed, the command is directed to the operating system by the resource manager and handled by the operating system in the normal manner for input/output devices of the prior art.

Address translations in hardware

When the operation involves a device directly associated with the control unit 29 on its device bus 34, the commands after the first commands (creating the new data structure, attaching its new virtual name,providing any necessary device context, and creating the address translation) are sent by hardware directly to that device for execution. If the command requires that data be transferred to or from the application, the input/output device performs the transfer using the DMA unit 35. Upon the return of data in response to a command, the DMA unit 35 of the control unit 29 responds by transferring the data to main memory and notifying the central processing unit in a separate DMA operation of the existence of the data so that no local bus read operation by the central processing unit 21 is necessary to ascertain the result of the operation or to receive the data provided.

Legacy operations

In contrast to the operation discussed above, if an application program does not utilize the advantages of the new input/output system, it may still function in the manner of existing applications running on prior art systems. For example, older application programs operating in a multitasking system which have no knowledge of the new input/output system and are attempting a subroutine call to request the operating system to perform an operation using an input/output device associated with the unit 29 will trap into the operating system where its permission to proceed will be checked. The operating system will translate the call to the appropriate physical address and, finally, call the trusted code of the new system I/O driver #1 to execute the command. The new system I/O driver #1 functions in the manner of a typical driver of the prior art and executes the command by writing from its library of operations to the input/output control unit 29 in the manner described above for application programs with knowledge of the input/output control unit 29. In fact, the new I/O driver #1 functions in a manner essentially identical to an application program with knowledge of the control unit 29 by providing a virtual name for the device specified to which the physical addresses for that device may be attached with a command calling the device. The new driver #1 has mapped to its address space a portion of the physical addresses decoded by the unit 29. The command data generated in response to the command from the older program is then transferred by this driver to the FIFO unit 31 and processed in the same manner as are direct operations from an application with knowledge of the unit 29. Although this new I/O driver #1 functions as do other prior art drivers requiring the use of the operating system and stepping through the various stages of translation and permission checks, legacy software may utilize the architecture of the present invention without any additional requirements being placed on the system other than those which exist in the prior art. Moreover, this legacy code will run faster than on prior art systems because of the asynchronous result provided by the FIFO unit 31 and the write only operations that unit supports.

Specific details of the new architecture

FIG. 3 is a block diagram illustrating details of the input/output control unit 29 including the device bus 34 and the input/output devices arranged on that bus. As described above, the input/output control unit 29 includes a decode unit 30 which receives commands directly from the input/output bus 27 and transfers the commands to a pusher circuit 53 which transfers the command to one of the FIFO buffers 39 of the FIFO unit 31. The FIFO unit 31 stores the data along with the addresses for each of the commands being transferred to all of the input/output devices associated with the input/output control unit 29. The buffers 39 of the FIFO unit replace the individual data registers used by the input/output devices of the prior art. However, in contrast to the registers used by the prior art for communication on the input/output bus 27, the FIFO unit 31 allows a very much larger number of commands to be processed much more rapidly and facilitates the asynchronous operations of the input/output devices and the central processing unit. In one embodiment, the FIFO unit 31 includes 128 individual FIFO buffers 39 each of which has thirty-two stages. The use of 128 individual FIFO buffers 39 allows a FIFO buffer to be assigned to each of 128 different application programs which may be running on the central processing unit for the use of that application program alone. The thirty-two stages of each buffer 39 allow any FIFO buffer to hold thirty-two individual serially ordered commands at any time. Although each of the stages of the FIFO unit 31 holds (along with the address bits) the data held by an individual register of a typical prior art input/output device, a particular system has the ability to store commands for over 16 thousand 32 bit registers for each of 128 different application programs which may map different addresses decoded by the input/output control unit 29.

Addresses

Figure 4:
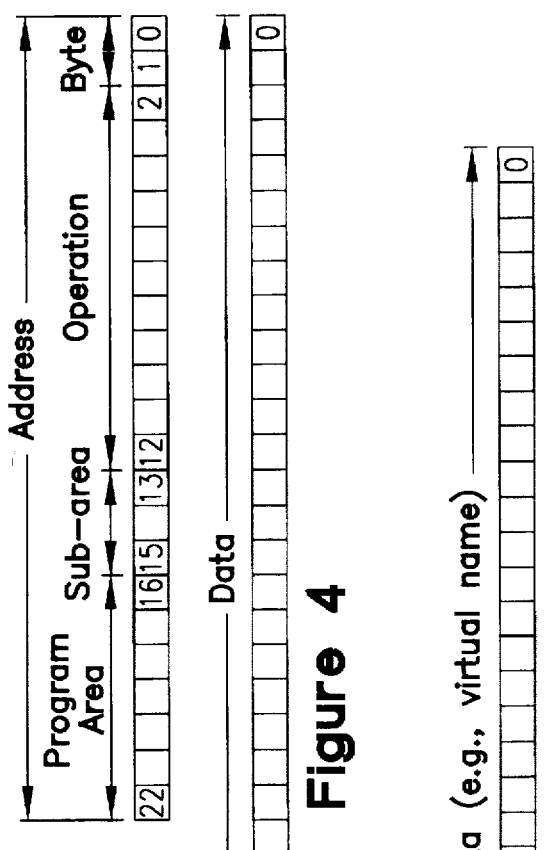
FIG. 4 illustrates the address and data bits utilized in one embodiment of the invention.

In one embodiment, the entries in each FIFO buffer 39 include thirty-two bits of data space and sixteen bits of the twenty-three bits of address space decoded by the input/output control unit 29. The remaining upper seven bits of the address represent the 128 distinct areas which are available and thus define the particular one of the FIFO buffers 39 which is utilized by a particular application program. The address and data space of the total command space (including that in the FIFO unit and the seven highest order bits defining the area assigned to the application program by the operating system) are pictured in FIG. 4. The twenty-three bits of address space are sufficient to map eight megabytes of address space on the input/output control unit 29. The eight megabytes of address space is divided into the 128 individual areas each having 64 Kbytes which may be allotted by the operating system to an application program.

When a first command from an application program is transferred to the input/output control unit 29, decoding circuitry selects one of the FIFO buffers 39 using the upper seven bits of the twenty-three address bits representing the area designated for that program and transfers the command to an input stage of that FIFO buffer 39.

Each of the 128 addressable areas is subdivided into eight separate sub-areas each having eight Kbytes of address space. The next lower three bits of the address space represent these eight sub-areas. The application treats each of these eight sub-areas identically, designating at various times various objects representing particular input/output devices and their context, as being accessed through each sub-area. As will be seen later, each of these sub-area addresses represents one of eight registers which may store the physical address of an input/output device on the bus 34. The two lowest order bits of the address space represent byte positions in a command. In the preferred embodiment, the data is word aligned; and these bits are not included in the FIFO buffer 39. Consequently, eleven bits are left to represent a particular operation using the particular input/output device designated by the sub-area. With eleven bits of address space, 2048 individual operations (or portions thereof) are available for devices using addresses in each sub-area. In one embodiment, data structures (objects) are created in an object oriented programming language to represent the devices and their contexts which may be addressed in the sub-areas. The operations of the devices are then encoded as methods on each of these objects. This encoding of a sub-area as an object of a particular class is dynamic, and a new object representing a new device and its context may be encoded in the sub-area by an application program writing to offset zero, the special calling command which calls an address translation for a new device to the sub-area holding the address translation of an old object.

As pointed out above, when a program which is able to utilize the input/output system first requests that the operating system map a portion of the addresses decoded by the input/output control unit 29 to its address space, the operating system assigns physical addresses designating one of the 128 areas available for the input/output control unit 29 to the application. Since the I/O driver #1 is constructed never to map more than one application program to an area, the seven bits also identify the application program and the FIFO buffer 39 which it utilizes.

When an application program writes to the FIFO unit 31, the seven upper bits of the address are used to determine the sixty-four Kbyte area which it has been allotted by the operating system and the FIFO buffer 39 to which it is assigned. The three bit sub-area designation is used to select one of the eight Kbyte sub-areas which it may allot to a device. The eleven bit offset is used to determine the method or operation to be carried out by the device, and the thirty-two bit data space is used for the data related to the commanded operation. In a typical write operation, the write to any particular eleven bit offset invokes a particular method (operation to be performed indicated by the eleven bits) on the object (the input/output asset designated by the present name for the sub-area). However, these bits are also interpreted (1) to create a new data structure representing input/output devices which respond to virtual names given by the application program, (2) to provide direct translations from virtual names to physical addresses of input/output devices on the device bus 34, and (3) to call the resource manager to perform various software operations.

The puller circuit, current address registers, and translation table

These operations are accomplished by various circuitry and the resource manager, particularly by a puller circuit 40, a current physical address table 36 which includes eight address translations for devices presently in use, and a translation table 38 which may include a much larger number of address translations. In order to correctly direct the address and data provided in each command, each FIFO buffer 39 includes a circuit 40 called a puller which reviews the command about to be executed. The puller circuit is illustrated in more detail in FIG. 7. The puller circuit 40 looks at the address of the bottom command in the FIFO buffer 39. The puller circuit 40 uses the three sub-area bits of the address to determine which of the eight sub-areas (current address registers) of the table 36 associated with that buffer 39 is to receive the result of a lookup in the translation table 38.

Writes to zero offset

The puller circuit 40 also includes logic 71 which then determines whether the next eleven method bits of the address are all zero. If the eleven method bits are all zero, this indicates a write to the zero offset which is the special calling method used for indicating that an application wants a new translation for an input/output device; and the puller circuit 40 sends the data to the translation table 38 along with the upper seven bits from the address indicating the area and performs a lookup. It will be recalled that when the write is to this special calling method, the data is the virtual name of a device. The result of the lookup is an address on the device bus 34 and an instance number defining context which are placed into one of eight registers of the table 36 referenced by the three bit sub-area. When the physical address and instance number are placed in the register of the table 36, the puller circuit sends the seven bits indicating the area and the instance number to the input/output device to change the context on the device. This is the manner in which translations are made available for immediate use.

Writes to non-zero offset

If the offset is not zero, the puller circuit 40 takes the three bits indicating the sub-area and indexes into the table 36 to the proper register to find the device bus physical address. The puller circuit 40 concatenates that address with the eleven bit offset designating the method and writes the method and thirty-two bits of data to that physical address on the bus 34. However, if the value read from the sub-area of the table 36 is a special value which indicates a failed translation, this value generates an interrupt which calls the resource manager. The resource manager then uses the command at the bottom of the FIFO buffer 39 to perform whatever software operation is required by the command. This helps assure that unsafe operations are handled by the operating system.

Figure 5:
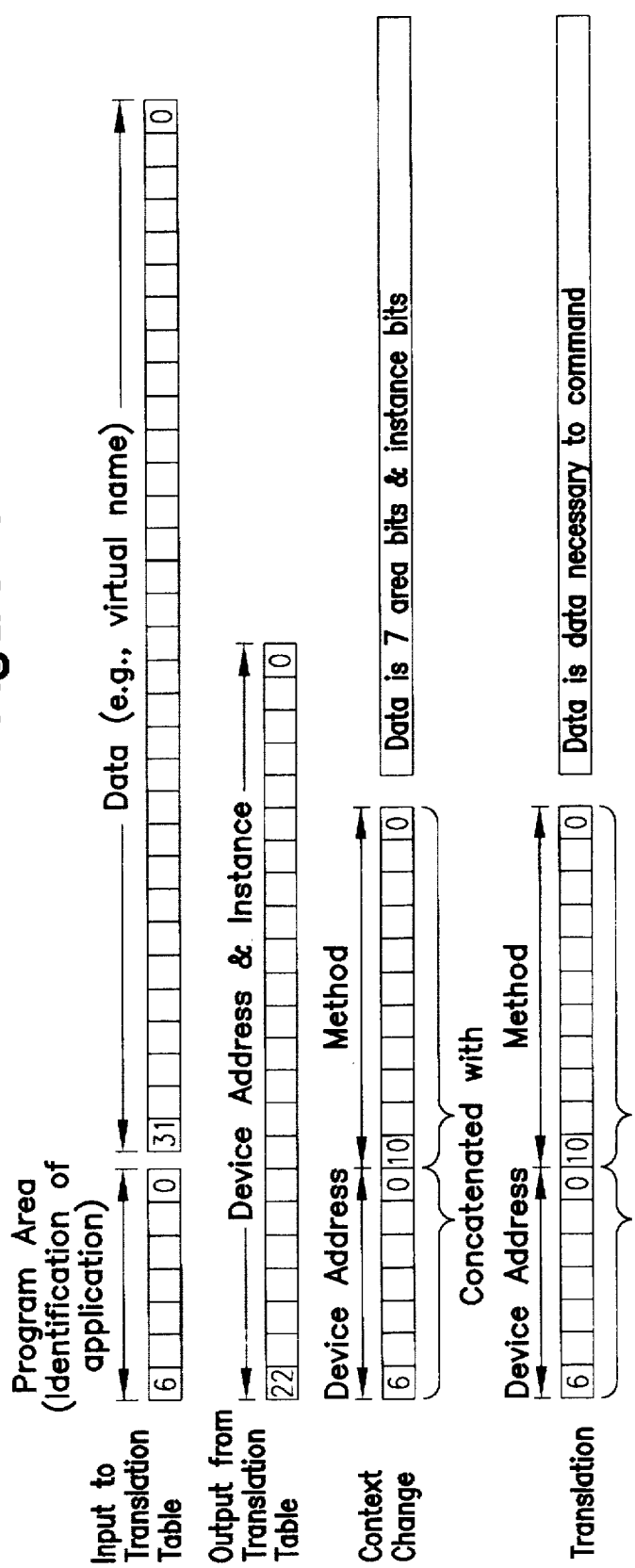
FIG. 5 is an illustration of entries in a translation table used in accordance with the invention.

FIG. 5 illustrates in the first two lines one entry in the translation table 38 utilized in one embodiment of the present invention. As may be seen, the seven bits of the address designating the area assigned to an application program and the thirty-two bit virtual name translate into twenty-three bits, seven of which indicate the address of the physical device on the device bus and sixteen of which indicate the instance of the data structure which provides the context to be placed on the input/output device. Additional control bits may also be included as a part of the translation data stored in the table 38 but are not shown. Each of the last two lines of FIG. 5 indicates one way in which the bits obtained in the translation are used. The eleven bits indicating the method invoked are concatenated with the physical address for the device retrieved from the translation table 38, and the concatenated value is placed on the bus 34 with data. Each of the input/output devices decodes addresses on the bus 34 to determine if it is the addressed device and responds accordingly to the operation indicated by the method.

Creation of a data structure

When an application program first writes to the area which it has been allotted by the operating system and is assigned to a FIFO buffer 39, the command is ultimately reviewed by the associated puller circuit 40. The puller circuit will find that the application program has selected one of the sub-areas using the three bit sub-area designation, selected an offset zero using the eleven bits, and has written a predefined name for a particular input/output device in the thirty-two bit data space. When the application program selects a zero offset as the eleven bits representing an operation, the application is indicating that it desires to call a data structure which has been named and make it immediately available for use. When a zero value is written as the eleven bit offset to any one of the sub-areas, this instructs the input/output control unit 29 to make available that one of the sub-areas to the newly-named object and to interpret eleven bit offsets within the sub-area as the various methods which are available to an object of that class.

When the application program writes the name of an object as data to offset zero of a sub-area, the puller circuit 40 takes the virtual name, adds the seven bits designating the area, and looks up the concatenated value in the translation table 38 to obtain the physical address on the device bus 34 and the instance number of the physical device which is responsible for the operation represented by the particular object being named. If a translation is in the table 38 and the object represents a line drawing device, the physical address on the bus 34 of the line drawing hardware in the graphics rendering engine should be returned. When the physical address is returned, it is placed in one of eight positions (registers) of the current physical address table 36 designating the sub-area to which the zero offset was written. If the translation for the physical object does not exist in the translation table 38 of the input/output control unit 29, however, the input/output control unit returns a miss. This transfers the operation to the resource manager. The resource manager places a special value (all zeros in one embodiment) in the appropriate register of the table 36 and uses the command at the bottom of the FIFO buffer to perform whatever software operation is required by the command.

On a first write to the input/output control unit 29 by an application program, there will be no translations for that object name in the translation table; and the operation will be transferred to the resource manager. The resource manager in the preferred embodiment of the invention has access to the database which includes the data structures for a number of predefined objects. These objects may represent hardware or software which implements various portions of the input/output operations. When an application program writes the name of a predefined object at an offset zero in one of the eight sub-areas, this is a request to the resource manager to make the predefined object one of the eight objects available for immediate use in one of the eight sub-areas. The application program follows this command with a command directed to the same sub-area to create an instance of the predefined object in the database and name it as the application program defines in the data bits of the command.

The resource manager reviews the details of the command being written and determines that is a write to a zero offset. This causes the resource manager to look at the predefined name to determine the class of the object. When it determines that this is a name for one of the predefined general classes of objects associated with the input/output control unit 29, the resource manager looks up the data structure for that object and makes that object immediately available. To make the object immediately available, the resource manager allots the sub-area to the predefined object but also places a special code in the table 36 to indicate that the object is a software object and the resource manager is to be called when the predefined object is addressed. Then the resource manager interprets the create command which follows as a create method for the predefined object and creates a new instance of the predefined object, names the instance using the name requested by the application program, and stores it as a new data structure in the object database.

Modifying context of a newly-created data structure

When the application program later desires to utilize the input/output device for which it has created a new object, it writes the name it has selected for the object as data to the zero offset address. The puller circuit 40 causes a lookup in the translation table 38 using the new virtual name and the seven bit area identification. Again, there will be no translation for that virtual device name in the translation table 38 since the data structure which has been created is a software object which has no translation in the table 38; and the operation will be transferred to the resource manager. The resource manager reviews the command and determines that is a write to a zero offset. This causes the resource manager to look up the new data structure with that virtual name in the object database to find the object which defines the input/output device. The resource manager uses the seven bits designating the area allotted to the application program and the thirty-two data bits providing the virtual name given by the application to find objects in its database.

When the resource manager finds the data structure, it places the special value in the addressed register of the table 36 instead of an address on the device bus 34 to indicate that this is still a software device. Until the physical device is utilized, the application program may send various commands as methods on the new object; and these will be executed by the resource manager. A plurality of low numbered offsets are utilized for modification of a software data structure. For example, the application program may send commands which set the details of the appropriate context values for that particular device functioning with the particular application program for the particular purpose. This changing of context from the context provided by the predefined data structure typically occurs before the device is utilized while only the software object is affected.

Placing safe translations in the translation table

Ultimately, when a physical input/output device receives a command which makes a first use of the physical device, the resource manager places a translation for the particular virtual-name-to-device-bus-address of the appropriate physical device in the translation table 38.

It should be noted that the virtual name selected by an application program for a particular data structure representing an input/output device and its context is used for the later retrieval of the address translation for that input/output device. In fact, a number of different application programs may use the same virtual name for the same or different virtual objects without causing any ambiguity, for each object created has its own separate area address bits which relate to that application alone.

In any case in which a translation for the virtual name to the device bus address for a new physical object is placed in the translation table 38, a number of additional bits which define the instance of the data structure and therefore indicate any context which is presently a part of the data structure and is necessary for the operation of the device with the application is also stored in the translation table 38 by the resource manager. As will be seen by doing this, the translation table 38 is being used to trap operations which require context switching before a device is allowed to perform an operation. Finally, the resource manager restarts the write operation. The lookup in the translation table 38 then succeeds. This causes the physical address and instance value to be placed in the register of the table 36 and the puller 40 to send the seven area bits and instance value to the input/output device to change the device context.

When the physical address on the device bus 34 and the instance value of the device corresponding to the current object are first placed in a register of the current address table 36, the address is used by the puller to send the instance value and the seven bits indicating the application program (and the address area) to the device on the device bus 34 (see line three of FIG. 5). The device compares the seven bits and the instance value to the area and instance it is presently utilizing. If they differ, the device changes its context or interrupts the resource manager to change its context so that the device is properly initialized for the application program.

Thus, whenever an application program selects a different input/output device to utilize a sub-area of the address space by writing to offset zero of that sub-area, the change of input/output device causes the puller to send the area bits and the instance value to the input/output device to change any required context.

When an application program writes the virtual name of an object to offset zero in one of the sub-areas, and when the lookup in table 38 of that virtual name succeeds, the physical address of the corresponding device on the device bus 34 and the instance value are also stored in a slot of the eight entry current physical address table 36 which slot corresponds to the sub-area to which the virtual name was written. The table 36 stores the physical address on the device bus 34 of the device corresponding to the current object accessible in that sub-area, if there is such a device. If there is not a physical device or there is no translation in the table 38, the entry stores the special value which has no translation and therefore causes the input/output control unit 29 to interrupt into the resource manager.

Writing directly to input/output devices

After the physical address on the device bus 34 of the device corresponding to the current object has been placed in the current address table 36, when a next write occurs to that object as indicated by the three bits of the address selecting the particular sub-area, the offset address will typically be other than zero. This offset will indicate the method invoked on the object. This offset (indicated by the eleven bits) is concatenated with the physical address held in the table 36 (see line 4 of FIG. 5) and broadcast on the device bus 34 to select the particular input/output device and the operation indicated by the method which is to be performed by that device. All of the devices on the device bus 34 listen on the bus and decode commands addressed to them.

Current address registers and sub-areas

Since eight sub-areas are available at once through the current address table 36, an application program may write up to eight virtual names for devices the application desires to utilize in input/output operations and have physical addresses for those devices immediately available by simply writing the virtual name to the zero offset of a sub-area. Thus, up to eight objects (devices) may have address translations immediately available in the table 36 for the application program using the FIFO unit 31.

The eight sub-areas available provide a large number of output options for an application program. The availability of eight sub-areas allows the application to accomplish a number of functions without the necessity of a translation table lookup and thus speeds input/output operations. However, since any application program may need to have access to all of the input/output assets which are available, the system provides a rapid manner of providing assets in addition to the eight devices which are represented by objects which fill the eight sub-areas allotted to that application program. When all of the eight sub-areas have been used by an application program so that input/output-to-device bus physical address translations for a device exist in each of the eight spaces in the table 36 and the application program running desires to write to a different input/output device, the application program may select a new device which it desires to use and place its address translation in the table 36 in place of any address translation presently occupying one of the registers. To accomplish this, the application program writes a new virtual name of a device as data directed to the zero offset of any of the eight sub-areas. This causes the input/output control unit 29 to replace the object presently occupying the sub-area with a new object representing the device indicated by the newly presented virtual name. This is accomplished by the puller circuit 40 initiating a lookup in the translation table 38 and a replacement of the physical address in the table 36 designating the object in the sub-area with the physical address of the new device if a translation for the new object for the physical device has already been placed in the translation table 38 by the resource manager. Whenever an application program places a different translation in a register of the table 36, the change of address causes the puller to send the area bits and the instance value to the input/output device to change any required context.

However, if this is the first use of this object by the application program, the name-to-physical-address-translation is not in the translation table 38. The new virtual name causes the virtual-name-to-physical-address translation to miss in the translation table 38 so that the operation is trapped and sent to the resource manager. Presuming that an instance of a predefined data structure has already been created under the virtual name, the resource manager recognizes the zero offset as calling for a new object, reviews the new name, and finds the data structure for that name in the database. It uses the object data structure to obtain the instance value indicating the context for that new input/output device and writes the virtual-name-to-physical-address translation and instance value into the translation table 38. The operation then proceeds and succeeds, the physical address and instance value for the object is placed in the current physical address table 36 in the register in which the object being replaced previously resided, and the context of the device is updated. When the next write occurs for that named input/output device, the physical address translations for that device (object) will be in the current physical address table 36 so that it may be immediately placed on the bus 34. Thus, the resource manager is called and assures that the context on an input/output device is correct before its address translation is placed in the physical address table 36.

Whenever any object is named for which the physical address is not in the physical address table 36 but for which a translation is available in the translation table 38, the lookup of that virtual name succeeds, the physical address and instance number of the corresponding device on the device bus 34 is stored in a slot of the current physical address table which corresponds to the sub-area to which the virtual name was written. Thereafter, writing to an offset to this sub-area will indicate a method invoked on the new object in the sub-area. This method (indicated by the eleven bits) is concatenated with the physical address held in the table 36 and broadcast on the device bus 34 to select the particular input/output device and the operation (indicated by the method) which is to be performed by that device. In this manner, the tables 36 and 38 act as a two level cache for object name translations which the application utilizing the FIFO unit 31 may immediately access and makes an extraordinarily large number of operations available even though the physical address space allotted to the program is limited.

Although 2048 operations are available for each object which is physically on the device bus 34, it is probable that some number of the operations (methods) will not be implemented in hardware. When an input/output device receives a command including a method it cannot carry out, the device addressed responds to the command indicated by the offset by generating an interrupt indicating that the hardware cannot deal with the operation. The interrupt calls the software of the resource manager so that the resource manager may accomplish the operation. This allows those operations which are invoked very infrequently to be carried out in software, while those operations which are used frequently are implemented in hardware in order to speed up the system. In order to assist this operation, each input/output device on the device bus 34 also provides a signal to the puller circuit 40 to signal the puller circuit that no commands are to be transferred to the input/output device which has generated the interrupt until the interrupt servicing has been completed.

Thus, as may be seen, the resource manager is a piece of software which is associated with the input/output control unit 29 and determines that the input/output control unit 29 functions correctly. It maintains a database of data structures which represent the various input/output devices and the context that those devices require to function correctly. It fills the translation table 38, does the necessary context switching for initializing the physical devices, provides routines for less used input/output operations which input/output devices may invoke through interrupts, and does other things required to run the input/output control unit 29. The resource manager may be thought of as part of the operating system and takes the place of the device driver used in a conventional input/output system. The resource manager maps in a part of the physical hardware of the input/output control unit 29 called the privileged address space. This space is distinct from the FIFO unit. Unlike the application programs operating with input/output devices, the resource manager both reads and writes this address space to perform its various tasks such as context switching. Unlike all of the device drivers of the prior art, the resource manager accomplishes its functions after the hardware of the input/output control unit 29 has been directly addressed by an application program rather than before. Moreover, in the overall operation of the input/output control unit 29, the resource manager is used infrequently compared to the hardware portions of the input/output control unit 29 since the resource manager attends only to creation operations, the various software implementations of methods, and unsafe operations.

When a first application program writes to the input/output control unit 29 in the embodiment illustrated, one of the FIFO buffers 39 of the FIFO unit 31 is dedicated to its use depending on the seven bits designating the area mapped. The various commands written will gradually fill the FIFO buffer 39. Since an area is mapped to the address space of only one application program, all of the commands in the FIFO buffer 39 are directed to responding to that program. Moreover, once an object has been made accessible in a sub-area, the three bits designating that sub-area indicate the meaning of the eleven bits designating the operations which apply to the object in that sub-area. When a new object is made accessible in a sub-area by writing to a zero offset for that sub-area, commands to that sub-area call forth the particular methods (operations) related to that object (device).

Because the amount of space in each of the FIFO buffers is limited to thirty-two entries in the embodiment being described (and will be limited to some finite number in any embodiment), it is possible for a buffer 39 to fill with data and be unable to take more commands directed to the particular area. As discussed previously, this will occur when the central processing unit is writing a FIFO buffer 39 faster than the input/output control unit 29 is able to handle the commands placed in the FIFO unit 31. In such a case, the input/output control unit 29 issues a hold command on the bus 27 to stop additional commands from being sent by the application program. During the holdoff period, the puller circuit 40 may empty some of the commands of the application program from the FIFO buffer 39 so that space will be available. Alternatively, when the bus holdoff expires, commands from the program may still fill the FIFO buffer 39; and the new commands may have to be otherwise dealt with or the data will be lost to the input/output control unit 29.

In one embodiment of the invention, a flow control register 45 is included for each FIFO buffer 39 of the input/output control unit 29. The register 45 stores an indication of the number of available spaces for commands in the associated FIFO buffer 39. The use of this flow control register 45 allows a requirement to be placed on an application program attempting an access of the input/output control unit 29 that it first determine whether space is available in the FIFO unit 31 before it writes any command. Before writing any data, the application program must determine the amount of "free" space to which it may write. This it does by having the central processing unit read the value in the flow control register 45 associated with the FIFO buffer 39 being utilized. Once this value has been read, the application program may send up to that amount of data before it need test again to determine whether free space remains to which it may send more data.

A flow control register 45 may be very simply implemented by utilizing a single bit in each stage of the FIFO buffer 39 to provide an indication that the stage is empty or filled. For example, a valid bit in each stage of the FIFO buffer 39 may act as such a register 45. If so implemented, the count of empty stages may be translated by a hardware or software algorithm to a binary number to be used to respond to a read by the central processing unit.

In one embodiment of the invention the individual buffers 39 are implemented utilizing an array of random access memory (RAM). In such an arrangement, the data comprising the commands is placed in the RAM and pointers are utilized to define the positions of the beginning and end of the individual FIFO buffers 39 and the beginning and end of the data. In such an embodiment, a simple subtraction of a pointer designating the last data placed in a particular RAM buffer from the pointer designating the end of the buffer provides the value to be held by the flow control register. In such a case, the flow control register itself may be a logical register whose contents are computed whenever it is read.

The use of the flow control register 45 allows an application program presently using the resources of the input/output control unit 29 to proceed without causing the overflow of the FIFO unit 31. Whenever the application has written commands totaling the amount previously read from the register 45, it must read the register again. This is especially useful for application programs which may wish to transfer a series of commands in sequence, possibly using the burst transfer mode of operation provided by many of the modern buses. By ascertaining the space available in the FIFO buffer 39 before transferring a sequence of commands, the application can know that sufficient space will be available for the operation. Provided that no application program ever writes more than the data for which it has permission, no data will be lost.

Various operating conditions can cause the flow control register 45 associated with a buffer 39 to store different values. If the central processing unit is writing at a rate faster than the input/output device can handle the commands, then a FIFO buffer 39 which is initially empty and provides a maximum free count value when read by the central processing unit will provide a lower free count number after the amount of data first indicated by the free count register has been sent. This will occur because the FIFO buffer 39 will empty more slowly than it is filled. In such a case, the next value read by the application program after sending the amount of data designated by the free count register will be a smaller number. The application program may again send this amount of data and be sure that the FIFO buffer will not overflow. On the other hand, if the central processing unit is writing at a rate slower than the input/output device can handle the commands, then a FIFO buffer which is initially empty and provides a maximum free count value when read by the central processing unit, will provide the same free count number after the amount of data first indicated by the flow control register has been sent. This will occur because the FIFO will empty more rapidly than it is filled and will always be empty when the register 45 is read by the central processing unit.

One problem which must be appreciated is that the FIFO buffer should be large enough to allow sufficient storage for the size of the data to be transferred by any of the commands or the FIFO buffer will never provide a free count value large enough for the central processing unit to send an initial sequence of commands. Thus, a FIFO buffer which is able to hold only 48 bytes of data will never provide a free count large enough to allow the transfer of data with a command which desires to transfer 64 bytes of data.

In utilizing the free count value, the application program should deduct the value of any data which it has already written before each new write operation commences. In this manner, the application program knows at any time the amount of data which it may still write to the input/output device before another read of the free count register will be required. This allows a number of write operations to occur before a read of the register 45 (which significantly slows operation of the overall system) need occur. This also assures that any writes which might be presently in the write channel on the input/output bus are accounted for in determining the actual value of the free count left. It should be noted that this read of the free count register is the only read necessary in dealing with the input/output control unit 29. It would be possible either to interrupt the central processing unit if a FIFO buffer 39 filled or to use the DMA unit 35 to transfer the value in the free count register to the central processing unit instead of reading the value, but in the particular embodiment reading the free count register appears to be the fastest operation.

So long as there is at least one FIFO buffer 39 for each application program which functions as a fixed allocation of local storage for each input/output device, the assignment of another FIFO buffer to another program does not reduce the amount of storage available at the input/output device for the first program. Each FIFO buffer acts as storage for the input/output device for the particular program writing to the input/output device so that space allotted to one program is still available to that program even though another FIFO buffer is allotted to another program by the input/output device.

In one embodiment, the application program may obtain a free count value indicating the number of free entries in a FIFO buffer 39 by reading from a designated method offset in any of the sub-areas of the area mapped to the application program. The value read is that stored in the flow control register 45 associated with the particular FIFO buffer 39. This value is then placed on the bus when the central processing unit provides the appropriate control signals to implement the read operation. The application may write up to the amount of data designated by this free count value without further testing and be certain that overflow of the FIFO buffer 39 will not occur.

As has been mentioned above, the central processing unit and the FIFO buffers 39 do not normally operate at the same speeds. For many hardware operations at the input/output device such as describing the points of a polyline using a graphics controller, the FIFO buffers 39 are able to operate much more rapidly than the central processing unit is able to write data to the input/output control unit 29. On the other hand, when the input/output control unit 29 uses the resource manager to execute one of the commands, the operation of the FIFO unit 31 slows down; and the central processing unit may fill a FIFO buffer 39 much more rapidly than it can be emptied.

It is very desirable to reduce the number of times the free count register of a FIFO buffer 39 is read. This is true because read operations take much longer than write operations. Before any read operation can be carried out, all of the write operations in the write pipeline from the central processing unit to the input/output control unit 29 must be completed so that the write pipeline is flushed. Reducing the number of free count register reads significantly increases overall input/output system speed.

If a FIFO buffer 39 is emptying faster than it is being filled, then each time the application program reads the associated free count register to determine how much space there is left in the FIFO buffer, the number read in the register will be gradually increasing until it gets to the size of the FIFO and can get no bigger. Thus, each time the application program reads the free count register during such a situation, the read is actually a waste. In fact, if a FIFO buffer 39 is actually emptying faster than it is being filled, then the amount read is less and often much less than the amount of data which can be sent before a next read of the register is actually necessary.

In order to take advantage of situations in which a FIFO buffer 39 is actually emptying faster than it is being filled, an improved design for the basic free count register arrangement has been devised. The improved design provides an arrangement by which the input/output control unit 29 may provide a larger number for the free count register than the space actually available in the associated FIFO buffer 39.

This larger number when read by the application program allows the application program to send a larger number of commands to the input/output control unit 29 before a read of the free count register is necessary. This reduces the number of read operations of the free count register required by the central processing unit and speeds the operation of the system. In one embodiment, the improvement causes a reduction of total flow control overhead on the bus 27 from fourteen percent of all bus cycles to eight percent of the cycles and an attendant increase in speed on the bus 27.

In the embodiment described which includes FIFO buffers 39 each capable holding thirty-two commands each of which is thirty-two bits in length, a FIFO buffer holds 128 bytes of data. Consequently, a central processing unit read operation would normally be required after at most 128 bytes has been written by an application program. Using the present invention, the number in the free count register may be increased to values up to an amount equal to the amount of space available in a FIFO buffer 39 and a runout storage area. In one embodiment, the runout area may be set to hold 1024, 2048, 4096, or 8192 bytes of data. This gives the input/output control unit 29 the ability to provide a number of different free count values depending upon the particular application program which is running. The actual free count value may be set to such fixed increments, or an unlimited variation in the free count value subject to the amount of runout space available could be easily implemented.

It will be noted that reading the free count register is, in effect, a space allocation to the application program promising essentially that this much space is available and will not be taken away. Since the input/output control unit 29 is not keeping this promise when greater numbers are placed in the free count register than space is available, the practice of using a larger value than the space available is referred to as "lying."

Under optimal conditions, the process of lying works well and allows the system to run more rapidly whenever the hardware of the input/output control unit 29 is functioning more rapidly than the central processing unit can fill the FIFO buffers. However, there are times when the input/output control unit 29 slows down while the central processing unit speeds up so that the input/output control unit 29 may be caught lying. Under less than optimal conditions, the input/output device will receive a command which slows its operation; and it will begin to function more slowly than writes are being presented by the central processing unit. In such a case, the central processing unit will be filling a FIFO buffer 39 faster than the input/output control unit 29 can empty it. Since the input/output control unit 29 has furnished a value greater than the size of space available in the FIFO buffer to the application program from the free count register and the application program may write this larger amount of data before again checking the value in the free count register, there must be some arrangement to assure that data will not be lost. The present invention provides a runout area of memory to which data may be written when the input/output control unit 29 is caught lying. In one embodiment, this may be a part of the memory used by a graphics display controller which is in excess of the amount needed for the purpose of a frame buffer. In other embodiments, other types of memory which are associated with the input/output control unit 29 and may be conveniently accessed by the resource manager may be used. However, the size of the memory must be sufficient to provide space for data directed to all of the FIFO buffers which may overflow if caught lying.

In a case in which an application program has been given a value larger than the amount of space available in the FIFO buffer 39 to which the application program is writing and the input/output control unit 29 receives a command when the FIFO buffer is full, the pusher 53 generates a holdoff command to the bus 27 in order to stop the flow of write commands as soon as possible. If after the holdoff period has expired, the FIFO buffer is still full, the pusher 53 sets the value in the free count register 45 to zero and transfers each of the next commands received on the bus 27 to runoff memory associated with the input/output control unit 29, recording the address and data of each command as it is stored. The pusher then interrupts the resource manager which waits for the puller circuit 40 to complete processing the commands remaining in the FIFO buffer. When the puller circuit 40 has completed emptying the FIFO buffer 39, the resource manager takes over the operation of processing the commands.

The resource manager takes over each of the functions of the puller in so far as the transferring of commands to the various portions of the input/output control unit 29 are concerned until any runout memory storing commands originally directed to that FIFO buffer 39 are empty. The resource manager must execute the commands in sequence in order for the operations to be executed correctly. For this reason, all commands addressed to the overflowing FIFO buffer 39 after a first command is sent to the runout area must also be sent to the runout area. The value in the free count register is held at zero until all of the data in both the FIFO buffer 39 and the runout area have been cleared.

Figure 7:
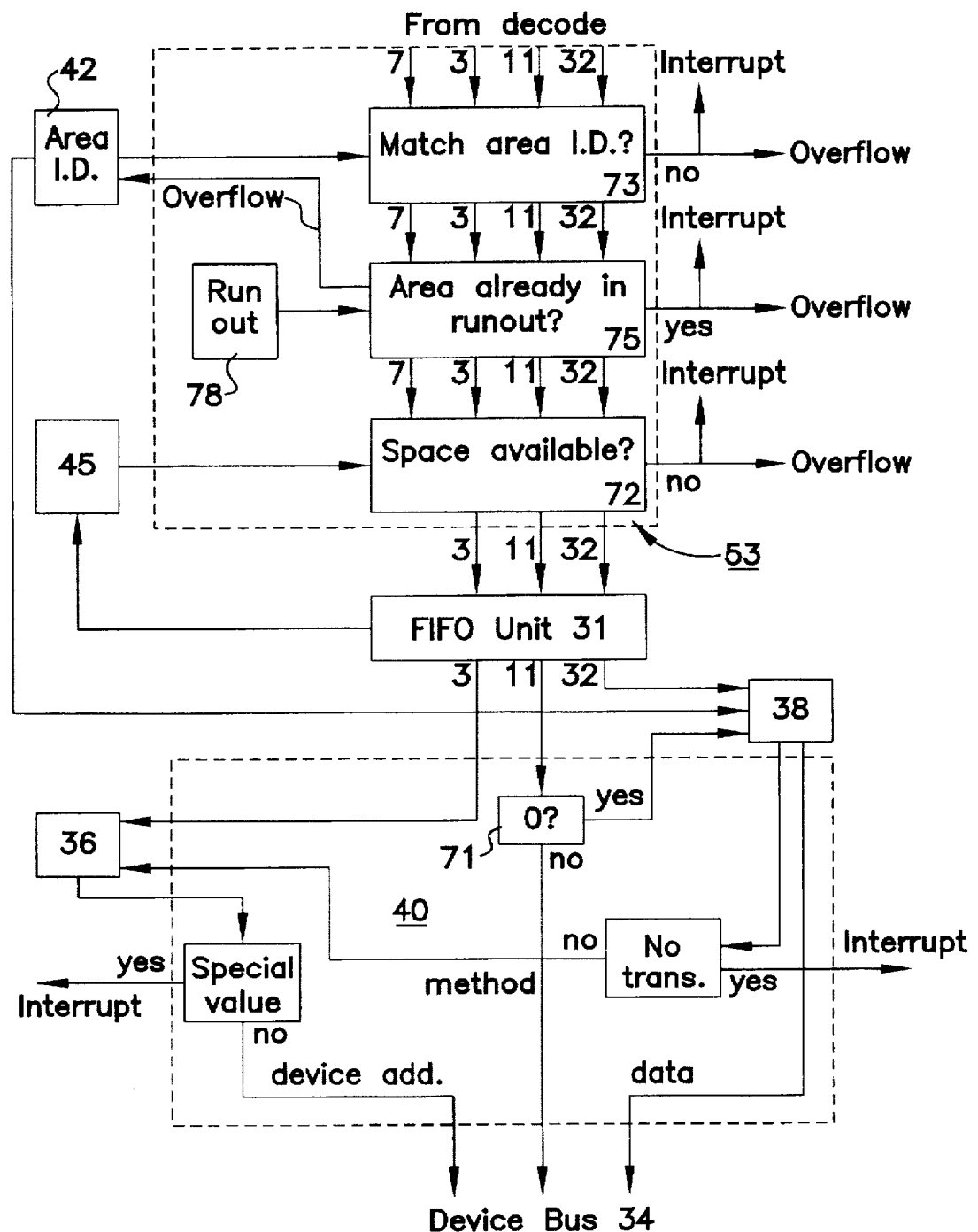
FIG. 7 is a block diagram illustrating in more detail specific portions of the circuitry shown in FIG. 6.

The pusher circuit 53 shown in detail in FIG. 7 is designed to assist in controlling the operations related to FIFO changes including changing application programs using a FIFO buffer 39 and controlling overflow. With each new command being transferred to a FIFO buffer 39, logic circuitry 73 matches the area identification bits with those of the incoming application and detects whether a different application has commands in the FIFO buffer 39. If the seven area bits of the commands in the FIFO buffer do not match those bits of the new command, the command is sent to the runout area of memory. If the commands in the buffer are those of the application sending the new command, the command is sent to a logic circuit 75 which determines whether commands have already overflowed the FIFO buffer 39 and been sent to the runout memory. If so, the new command is sent to the runout area as well. If not, the command proceeds toward the FIFO buffer. Finally, the command is sent to logic circuit 77 which determines whether there is space available in the FIFO buffer by testing the actual count in the free count register. If space exists, the command is placed in the FIFO buffer. If no space exists, the command is sent to the runout area and the fact of overflow is recorded in a register 78.

The commands including the addresses and data must be stored in the runout area in accordance with their area addresses. This allows a number of different FIFO buffers 39 to overflow at the same time without disturbing the data being transferred by any of the application programs. After the FIFO buffer has been emptied and the commands in the runout area have been executed by the resource manager, the resource manager may turn the puller back on, signal the pusher 53 to allow the FIFO buffer 39 to fill again, reset the value in the free count register, and allow the normal operation of the input/output control unit 29 to continue.

In addition to handling the duties of the puller circuit 40, in one embodiment of the invention, the resource manager also attends to executing in sequence each of the commands in the runout memory assigned to that buffer 39. This means that the resource manager is able to emulate many of the operations which may be directed to all of the input/output devices associated with the input/output control unit 29 on the bus 34. Since the operations of the input/output devices are well known to those skilled in the art, the details of the particular operations which are implemented in software are not discussed here. However, it will be understood that the resource manager should have software commands for performing some of the operations of a graphics output controller, of a sound controller, of a disk controller, and any other input/output device which may be connected to the device bus 34. The resource manager may in many instances hand the individual commands off to the hardware joined to the input/output control unit 29 for execution rather than executing the commands in software; this will occur in instances in which the operation may be handled more expeditiously in hardware.

In order to accomplish lying, the invention stores data which indicates whether the device should allow lying or not in the data structure defining each predefined object. When an instance of the predefined object is created and given a virtual name by an application program, this data is transferred to the new data structure. In one embodiment, the data determining whether lying is allowed is included as a single bit with the physical address of the device. This bit is transferred to the translation table 38 when the object is called for use by the resource manager and is placed in one of the eight current address registers of the table 36 when the object is placed in one of the sub-areas. If the bit is in one condition, the free count register may be set to a value in excess of the value of space actually available in the FIFO buffer 39. Typically, the bit will only be set for devices which conduct operations which will drain the FIFO buffers rapidly. Since the lying bit is stored with each object, the resource manager can restrict lying to one or a few applications in order to conserve runout memory. It should be noted that since software operation are always slower than hardware operations, operations implemented in software typically do not utilize lying.

Those skilled in the art will recognize that the use of 128 individual FIFO buffers 39 to receive commands written by the central processing unit is very expensive and probably not economically feasible for use with personal computers. In addition, it is expensive of system resources for an operating system to context switch the central processing unit from one application program to another. Thus, the operating system will try to ensure that once an application is given the central processing unit the application will retain control long enough to amortize the cost of the context switch. This means that typically in a one processor system at most one FIFO buffer will be active at a time. In a multi-processor system, typically at most as many FIFO buffers will be active as there are processors.

The present invention provides a means for attaining almost the same speed as is possible with 128 FIFO buffers but much more economically.

Figure 6:
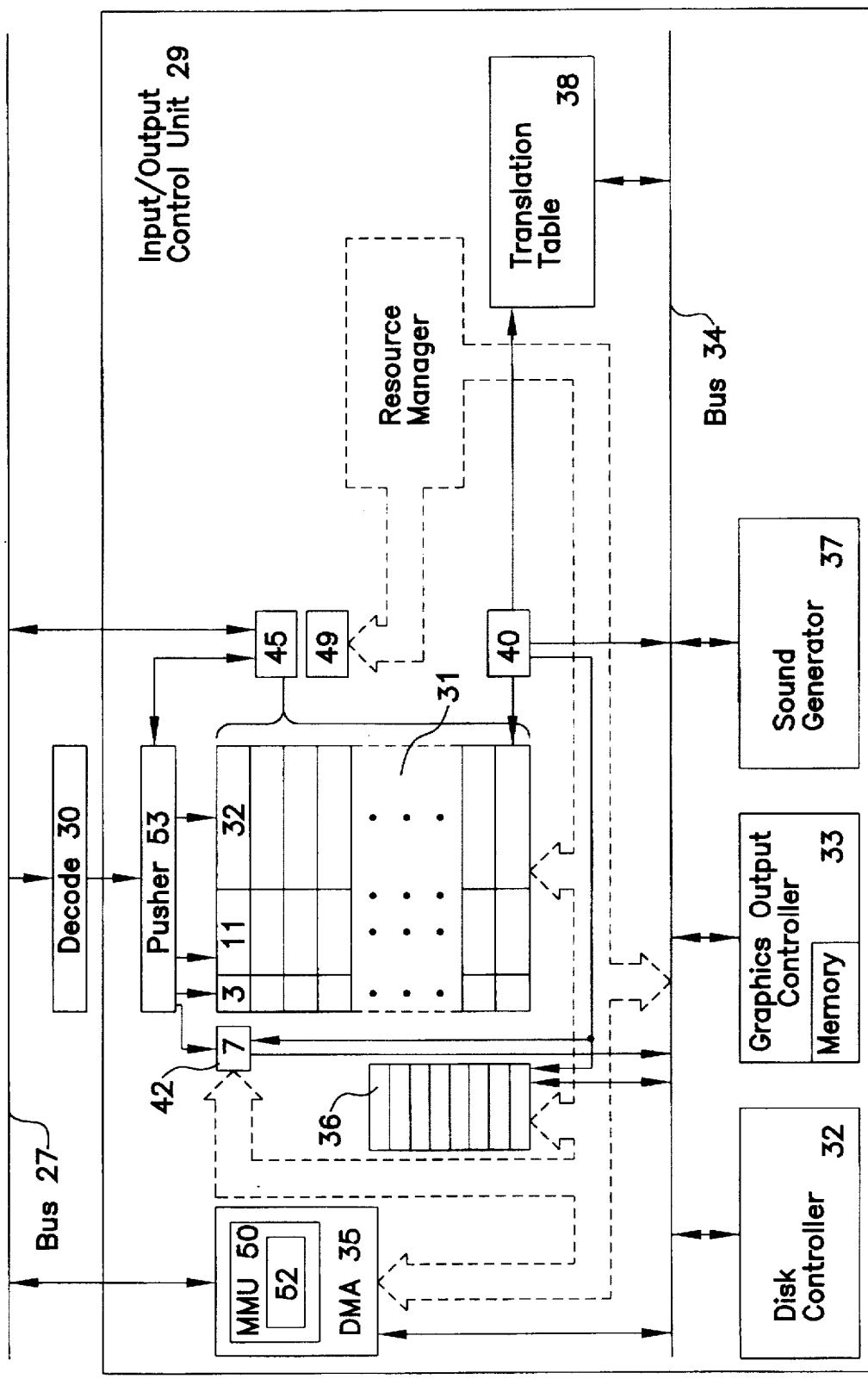
FIG. 6 is a block diagram of another embodiment of input/output circuitry used in a personal computer in accordance with the present invention.

Instead of 128 individual FIFO buffers 39, the present invention utilizes a smaller number of FIFO buffers 39 than the number of areas into which the input/output address space may be divided and thus the number of application programs which may be run. Utilizing a smaller number of FIFO buffers causes each FIFO buffer to function as a cache for commands which may be sent by any of the application programs. In the preferred embodiment, one FIFO buffer 39 is used for each processor which may be writing to the input/output control unit 29. For example, if the computer utilizes two processors arranged as symmetrical multiprocessors, then two individual FIFO buffers are utilized. If, as is usually the case, only a single central processing unit is used, then a single FIFO buffer 39 may in the limit act as a cache for commands from all application programs which may be running on the central processing unit. Such an arrangement is illustrated in FIG. 6. Of course, in either case more FIFO buffers might be used.

In order to act as a FIFO cache, any FIFO buffer 39 stores commands from only one application program at a time. To accomplish this, the input/output control unit 29 also includes a register 42 associated with each FIFO buffer 39. The register 42 stores the upper seven bits of the address designating the area (and thus the application program) for the commands presently in the FIFO buffer 39. When a first command from an application program is transferred to the input/output control unit 29 having an empty FIFO buffer 39, the seven bits representing the input/output address area allotted to that program are placed in the register 42 associated with that FIFO buffer 39 where they are held until the application program using the FIFO buffer 39 changes. Since each area is assigned to only a single application program, these seven bits clearly designate the particular one of the application programs presently having access to the particular FIFO buffer 39. The bits in this register are used to access the translation table 38 and the current physical address table 36 to obtain translations from virtual names to physical addresses in the manner explained above.

As with the embodiments which use one FIFO buffer for each application area, a free count register 45 and a puller are included with each FIFO buffer 39 as a part of the input/output control unit 29. The register 45 stores an indication of the number of available entries in each FIFO buffer 39 of the FIFO unit 31 and allows a requirement to be placed on an application program attempting to access the input/output control unit 29 that it first determine whether space is available in the FIFO unit 31. It also allows an application presently using the resources of the input/output control unit 29 to proceed without overflowing the FIFO unit 31. The application program may obtain a boundary value indicating the number of free entries in the FIFO buffer by reading from a designated offset in any of the sub-areas of its mapped area. The application may write up to the amount of data designated by this boundary value without further testing and be certain that overflow of the FIFO unit will not occur. As with the multiple FIFO buffer embodiments, the FIFO buffer arrangements of the present invention make use of a memory runout area; such a memory runout area assures that a FIFO buffer may be used to cache commands from a plurality of application programs. The use of a memory runout area also allows the system to make use of lying in order to enhance the speed of transfer by reducing the number of read operations by the central processing unit of the free count register 45.

In order to assure that the commands from different programs may utilize a small number of FIFO buffers 39 in the manner of a cache, the seven bits of each new command indicating the address area are compared with the seven bits held in the register 42. If these bits match and there is space in the associated FIFO buffer, the new command is entered in the FIFO buffer. If the bits match and the FIFO buffer is full, the bus will be held off; if the hold off expires and the FIFO buffer is still full, the commands will be stored in the runout area. If the bits match and commands for that FIFO buffer are already in the runout area, the new commands will be stored in the runout area. If the bits differ from those in the register but a cache is empty and there are no commands in the runout area, the seven bits for that command are written to the register 42 associated with the empty FIFO buffer and the commands are stored in that FIFO buffer. If the bits differ from those in the register and the runout area is empty but none of the FIFO buffers are empty, the new commands are stored in the runout area. If the bits differ from those in the register and the runout area is not empty, the new commands are stored in the runout area.

In order to keep the various application programs from overrunning the runout area, each application which has data is the runout area but none in a FIFO buffer will receive a zero value when it reads a free count register to determine how much space it has available. Once an application program has written commands which overflow the FIFO buffer and are sent to the runout area, all additional write must go to the runout area to maintain proper sequence. Once an application program has written commands which overflow the FIFO buffer and are sent to the runout area, the application program will receive a zero value when it reads a free count register to determine how much space it has available.

Thus, when in the embodiment illustrated in FIG. 6, an application program writes to the input/output control unit 29, the FIFO buffer 39 is dedicated to its use. The various commands written by that application program will gradually fill the FIFO unit. Since the input/output control unit 29 knows that it is responding to commands from a single application program (a single area is mapped to the address space of the application program), all of the commands in the FIFO buffer are directed to responding to that program.

When, in the embodiment illustrated in FIG. 6, the input/output control unit 29 is responding to commands from one application program and receives a command from a second application program, the FIFO buffer 39 changes and links itself to the second program. This occurs under control of the pusher circuit 53. If the FIFO buffer 39 is empty, this may occur immediately. If the FIFO buffer is filled with commands from another application program, these commands will be executed before the commands of the new application program are handled. In some cases, this may require that the commands from the second program be written into local memory associated with the input/output control unit 29 so that their execution will be delayed until the commands from the first application program have cleared the FIFO buffer. In this way, the FIFO buffer 39 provides the appearance of an 128 individual FIFO buffers for incoming programs in this particular embodiment.

When a command from an application program written to an offset zero with the virtual name of a device to make an input/output object which has been created accessible in one of the sub-areas, the virtual name of the device that corresponds to the object is concatenated with the seven highest bits in the register 42 indicating the application area and looked up in the translation table 38 to determine the physical address on the device bus 34 for that object. If the translation exists in the hash table 38, the physical address on the bus 34 is placed in the current physical address table 36. The physical address on the bus may then be concatenated with the eleven bits of the method designated in later commands which will cause immediate transfer of the command on the bus 34 to the device. The other operations of the input/output control unit 29 using the present invention proceed in the manner described above for input/output control units 29 which utilize a FIFO buffer for each application area.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An input circuit for an input/output device adapted for use in a computer system in which an application program writes commands directly to the input/output device which command includes information indicating the application program which initiated the command, the input circuit comprising:

a first-in first-out (FIFO) buffer circuit having a plurality of stages, each stage providing storage for commands from application programs including both data and an address for the data, means for determining from a command an application program which has initiated a command, and means for assuring that commands from only one application program reside in the FIFO buffer at any time.

2. An input circuit for an input/output device as claimed in claim 1 in which the means for assuring that commands from only one application program reside in the FIFO buffer at any time comprises a comparator circuit for comparing information indicating an application program which initiated the command in each newly-received command with information indicating an application program which initiated the command in commands in the FIFO circuit.

3. An input circuit for an input/output device as claimed in claim 2 further comprising a storage circuit, and means responsive to an indication from the comparator circuit that a command was initiated by an application program different than the application program which initiated commands residing in the FIFO circuit for transferring newly-received commands to the storage circuit.

4. An input circuit for an input/output device as claimed in claim 3 in which the means for determining from a command an application program which has initiated a command comprises a plurality of bit positions in each stage of the FIFO circuit.

5. An input circuit for an input/output device as claimed in claim 3 in which the means for determining from a command an application program which has initiated a command comprises a register for storing a plurality of bit positions from a command.

6. An input circuit for an input/output device as claimed in claim 5 in which the means for determining from a command directed to the FIFO circuit an application program which has initiated a command comprises a register for storing a plurality of bit positions from the address portion of a command.

7. An input circuit for an input/output device as claimed in claim 6 further comprising an output circuit for processing commands transferred through the FIFO circuit, and in which the output circuit addresses different areas of address space of an input/output device for each different application program which has initiated a command to the input/output device.

8. An input circuit for an input/output device as claimed in claim 3 further comprising an output circuit for processing commands transferred through the FIFO circuit, and means for processing commands in the storage circuit in sequential order.

9. An input circuit for an input/output device as claimed in claim 8 in which the comparator circuit further comprises means for delaying the transfer of commands to the FIFO circuit responsive to an indication from the comparator circuit that a command was initiated by an application program different than the application program which initiated commands residing in the FIFO circuit.

10. An input circuit for an input/output device as claimed in claim 1 further comprising a plurality of first-in first-out (FIFO) buffer circuits each having a plurality of stages, each stage providing storage for commands from application programs including both data and an address for the data.

11. An input circuit for an input/output device as claimed in claim 10 in which the means for assuring that commands from only one application program reside in the FIFO buffer at any time comprises a decoder circuit for comparing information indicating an application program which initiated the command in each newly-received command and transferring all commands from an application program to the same one of the plurality of FIFO buffer circuits.

12. An input circuit for an input/output device as claimed in claim 11 further comprising an output circuit for processing commands transferred through the FIFO circuit, and in which the output circuit addresses different areas of address space of an input/output device for each different application program which has initiated a command to the input/output device.

13. A computer system in which an application program writes commands directly to an input/output device which command includes information indicating the application program which initiated the command comprising:

a central processing unit, a system input/output bus, and an input/output device including an input circuit comprising:

a first-in first-out (FIFO) buffer circuit having a plurality of stages, each stage providing storage for commands from application programs including both data and an address for the data, means for determining from a command an application program which has initiated a command, and means for assuring that commands from only one application program reside in the FIFO buffer at any time.

14. A computer system as claimed in claim 13 in which the means for assuring that commands from only one application program reside in the FIFO buffer at any time comprises a comparator circuit for comparing information indicating an application program which initiated the command in each newly-received command with information indicating an application program which initiated the command in commands in the FIFO circuit.

15. A computer system as claimed in claim 14 in which the input circuit of the input/output device further comprises a storage circuit, and means responsive to an indication from the comparator circuit that a command was initiated by an application program different than the application program which initiated commands residing in the FIFO circuit for transferring newly-received commands to the storage circuit.

16. A computer system as claimed in claim 15 in which the means for determining from a command an application program which has initiated a command comprises a plurality of bit positions in each stage of the FIFO circuit.

17. A computer system as claimed in claim 15 in which the means for determining from a command an application program which has initiated a command comprises a register for storing a plurality of bit positions from a command.

18. A computer system as claimed in claim 17 in which the means for determining from a command directed to the FIFO circuit an application program which has initiated a command comprises a register for storing a plurality of bit positions from the address portion of a command.

19. A computer system as claimed in claim 18 in which the input circuit for the input/output device further comprises an output circuit for processing commands transferred through the FIFO circuit, and in which the output circuit addresses different areas of address space of an input/output device for each different application program which has initiated a command to the input/output device.

20. A computer system as claimed in claim 15 in which the input circuit for the input/output device further comprises an output circuit for processing commands transferred through the FIFO circuit, and means for processing commands in the storage circuit in sequential order.

21. A computer system as claimed in claim 20 in which the input circuit for the input/output device further comprises means for delaying the transfer of commands to the FIFO circuit responsive to an indication from the comparator circuit that a command was initiated by an application program different than the application program which initiated commands residing in the FIFO circuit.

22. A computer system as claimed in claim 13 in which the input circuit for the input/output device further comprises a plurality of first-in first-out (FIFO) buffer circuits each having a plurality of stages, each stage providing storage for commands from application programs including both data and an address for the data.

23. A computer system as claimed in claim 22 in which the means for assuring that commands from only one application program reside in the FIFO buffer at any time comprises a decoder circuit for comparing information indicating an application program which initiated the command in each newly-received command and transferring all commands from an application program to the same one of the plurality of FIFO buffer circuits.

24. A computer system as claimed in claim 23 in which the input circuit for the input/output device further comprises an output circuit for processing commands transferred through the FIFO circuit, and in which the output circuit addresses different areas of address space of an input/output device for each different application program which has initiated a command to the input/output device.

* * * * *